US008066256B2

(12) United States Patent
Platz et al.

(10) Patent No.: US 8,066,256 B2

(45) Date of Patent: Nov. 29, 2011

(54) VALVE ACTUATOR ASSEMBLY

(75) Inventors: Christian Platz, Haderslev (DK); Michael Birkelund, Middelfart (DK)

(73) Assignee: Danfoss A/S, Nordborg (DK)

(*) Notice: Subject to any disclaimer, the term of this patent is extended or adjusted under 35 U.S.C. 154(b) by 972 days.

(21) Appl. No.: 12/024,368

(22) Filed: Feb. 1, 2008

(65) Prior Publication Data

US 2009/0194727 A1 Aug. 6, 2009

(51) Int. Cl.
*F16K 31/00* (2006.01)

(52) U.S. Cl. ................................ 251/129.03; 251/335.3

(58) Field of Classification Search ............. 251/129.03, 251/335.1–335.3

See application file for complete search history.

(56) References Cited

U.S. PATENT DOCUMENTS 1,527,154 A 2/1925 Mallory et al.
2,238,401 A 4/1941 Shaw
2,608,353 A 8/1952 Cobb
2,617,621 A * 11/1952 Clarence ....................... 251/273
3,096,966 A * 7/1963 Mcfarland, Jr. ............... 251/214
3,251,575 A * 5/1966 Campbell et al. ............. 251/214
3,331,377 A * 7/1967 Castello ..................... 137/68.14
3,774,881 A 11/1973 Gregory
4,211,387 A * 7/1980 Getchell et al. ............ 251/335.3
4,526,341 A * 7/1985 Thomas ....................... 251/63.5
4,650,160 A * 3/1987 Smith ........................ 251/335.3
4,687,017 A 8/1987 Danko et al.
4,955,581 A * 9/1990 Dukas, Jr. ..................... 251/214
5,129,577 A * 7/1992 Kuze .......................... 251/335.3
5,197,712 A * 3/1993 Engelhardt ................ 251/335.3
5,394,900 A * 3/1995 Okuyama et al. ............. 137/510
6,199,396 B1 * 3/2001 Aizawa ......................... 251/148
6,305,665 B1 10/2001 Coura et al.
6,658,877 B2 12/2003 Kjøng-Rasmussen
6,666,231 B2 12/2003 Entwistle

FOREIGN PATENT DOCUMENTS

DE 3215799 A1 11/1983
EP 0508658 A2 10/1992
GB 843417 8/1960
WO 2006/042545 A1 4/2006

* cited by examiner

*Primary Examiner* — John Bastianelli

(74) *Attorney, Agent, or Firm* — McCormick, Paulding & Huber LLP

(57) ABSTRACT

An actuator assembly for actuating a valve includes an extensible bellow having an open end and a closed end, a stem operable to contact the closed end and to actuate a stopper mechanism, and a driver configured to move the bellow. The movement of the bellow effects movement of the stem to actuate the valve. In one embodiment, the driver acts to compress the bellow, the compression causing movement of the stem to open the valve. The bellow may be hermetically sealed to the valve housing, thereby allowing a higher range of fluid pressures.

21 Claims, 2 Drawing Sheets

10 14 46 45 44 47 52 54 50 42 48 34 32 33 26 36 40 38 18 28 20 30 76 80 22 22 94 83 68 12 82 84 56 24 72 74 64 62 88 16 92 90 86 78

VALVE ACTUATOR ASSEMBLY

BACKGROUND OF THE INVENTION

1. Technical Field

This invention relates to valves and, more particularly, to sealing valve actuator assemblies.

2. Background Art

Valve assemblies commonly include a valve housing having an inlet and an outlet forming a fluid passage therebetween. The valve assembly further includes an actuator assembly comprising a stem assembly and a driver mechanism connected to the stem assembly. Generally, the actuator assembly operates to move or drive the stem assembly, thereby sealing off or permitting the fluid transfer.

Most actuator assemblies penetrate the valve housing. Sealing the actuator assembly to the valve housing is an important design consideration to prevent leakage of valve fluid between the valve housing and the ambient environment. A typical method of sealing includes securing a rubber gasket or O-ring between the valve housing and the actuator assembly.

Some actuator assemblies include a pliable cup-shaped diaphragm, or boot, to provide sealing between the valve fluid and the ambient environment. Although the boot provides some degree of sealing, the stem still must penetrate the boot, and therefore an additional seal is required.

Another valve sealing problem is encountered with valves having auxiliary actuators. If the primary valve is rendered inoperable, an auxiliary actuator may be used to operate the valve. Like the primary actuator, the auxiliary actuator assembly must be sealed to the valve housing.

Rubber gaskets or boots do not provide a hermetic seal under all conditions. The gasket or boot may leak when the internal pressure of the valve fluid is significantly higher than the ambient pressure, for example with servo valves. Rubber gaskets or boots are also prone to degradation over time and may be inadequate if the fluid to be sealed is environmentally harmful.

Another shortcoming with the valve designs of the prior art is that the stem assembly penetrates the boot. This configuration requires an extra seal, which can degrade and leak over time with valve usage and cycling.

Therefore, there is a need for a better sealing arrangement for valves.

SUMMARY OF THE INVENTION

According to the present invention, an actuator assembly for a valve includes a bellow having an open end and a closed end, a stem in contact with the closed end of the bellow, and a driver configured to move the bellow. Movement of the bellow causes the stem to move in such a manner as to actuate a stopper mechanism within the valve. The stopper mechanism in one embodiment is a shut-off device and a valve seat.

In a preferred embodiment, the bellow is hermetically sealed to the valve to advantageously allow higher fluid pressures within the valve. To maintain the hermetic seal, the stem is disposed within the interior region of the bellow. Alternatively, the stem is welded to the closed end. Another advantage of the present invention is that the stem does not penetrate the bellow, obviating the need for a separate sealing arrangement.

The actuator assembly is advantageously used as an auxiliary actuator, particularly wherein the valve fluid is a refrigerant, such as a chlorofluorocarbon (CFC), hydrofluorocarbon (HFC), or hydrochlorofluorocarbon (HCFC) refrigerant.

These and other objects, features, and advantages of the present invention will become apparent in light of the detailed description of the best mode embodiment thereof, as illustrated in the accompanying drawings.

DETAILED DESCRIPTION OF A PREFERRED EMBODIMENT

Figure 1:
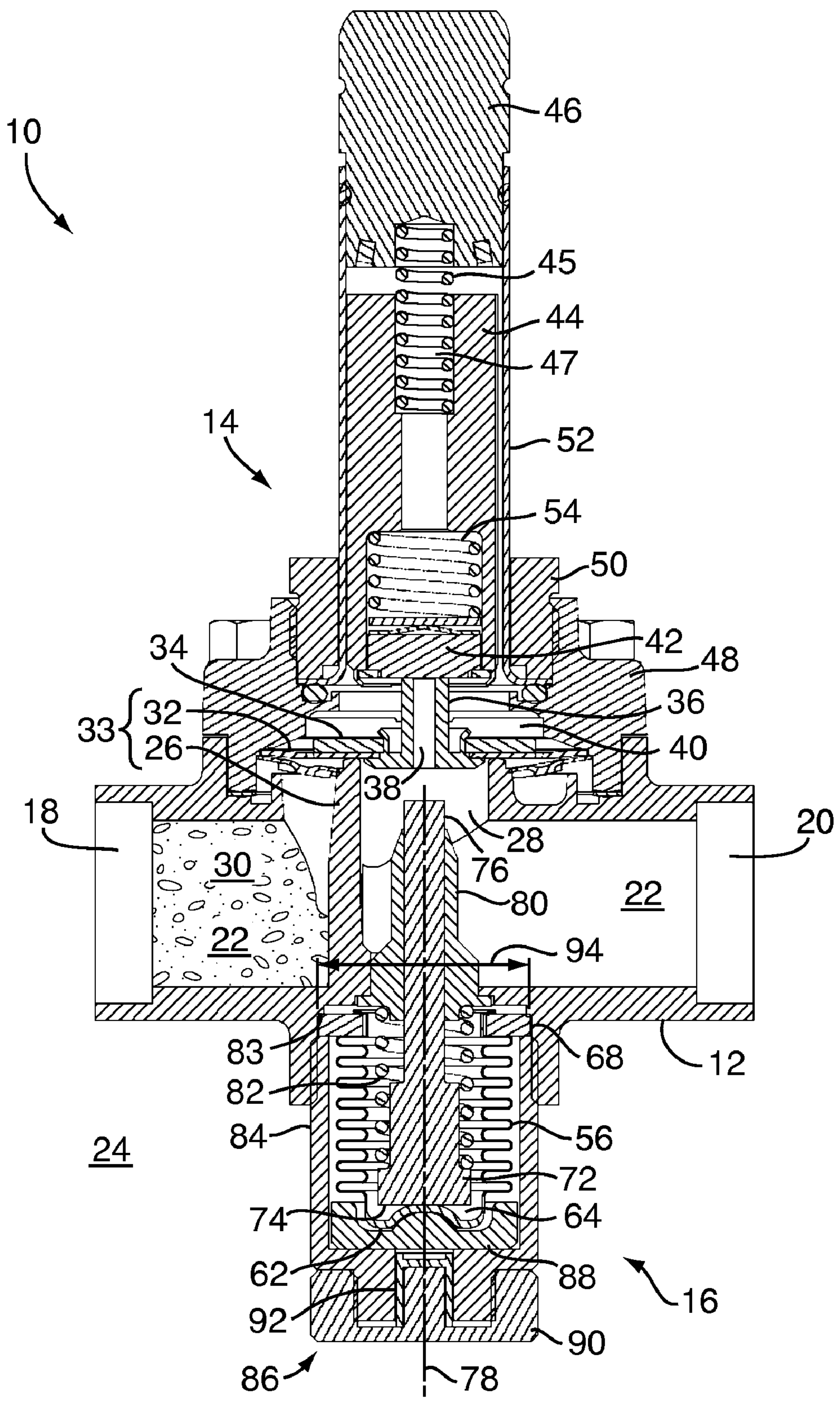
FIG. 1 is a cross sectional view of a valve including a servo valve assembly, a valve housing, and an auxiliary actuator assembly in accordance with the present invention.

Referring to FIG. 1, a valve 10 includes a valve housing 12. A servo valve assembly 14 and an auxiliary actuator assembly 16 are mounted onto the valve housing 12. The servo valve assembly 14 is shown in the de-energized state, hereinafter referred to as normally-closed. The valve housing 12 includes an inlet 18 and an outlet 20 forming an interior region 22 therebetween. The interior region 22 is separated by the housing 12 from an exterior region 24, which may be the ambient environment. The valve housing 12 also includes a valve seat 26 forming a main passage 28 to allow passage of a fluid 30 between the inlet 18 and the outlet 20.

The servo valve assembly 14 includes a shut-off device 32 that sealingly contacts the valve seat 26 to stop the flow of the fluid 30. The shut-off device 32 and the valve seat 26 form a stopper mechanism 33. The shut-off device 32 may be of any design suited for the particular purpose. In the disclosed example, the shut-off device 32 is a diaphragm, but may also be a conical plunger. A plate 34 provides structural support to the shut-off device 32. A pilot nozzle 36 defines a pilot passage 38 fluidly connecting a chamber 40 with the outlet 20. A sealing plug 42 is configured to sealingly contact the pilot passage 38 to close it off from the chamber 40 in the de-energized state. The servo valve assembly 14 further includes an armature 44 and an armature top 46 configured to lift the plug 42 off the pilot nozzle 36 in the energized state. The servo valve assembly 14 further includes a cover 48 mated to the valve housing 12, a retaining ring 50 to secure the cover 48, and an enclosure 52 to protect the armature 44 and armature top 46. A spring 45 is compressed in a cavity 47 in the center of the armature 44 and the armature top 46. An additional spring 54 is compressed between the plug 42 and the armature 44.

Figure 2:
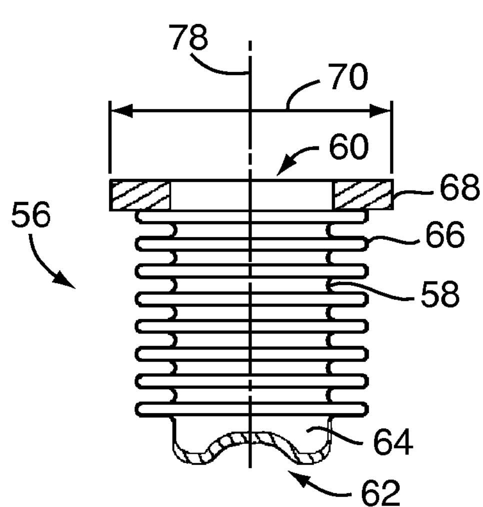
FIG. 2 is a cross sectional view of a bellow of the auxiliary actuator assembly of FIG. 1.

The auxiliary actuator assembly 16 of the valve 10 includes an expansible bellow 56 mounted to the valve housing 12. As shown in FIG. 2, the bellow 56 includes a longitudinally extending tube 58 having an open end 60, a closed end 62, and an interior region 64 formed therein. The tube 58 includes a corrugated tubular sidewall 66 to provide the bellow effect. In one embodiment, the open end 60 is welded to a flange 68 having an outer diameter 70.

As seen in FIG. 1 and FIG. 2, the interior region 64 of the bellow 56 is oriented toward the interior region 22 of the valve housing 12. The open end 60 of the bellow 56 is mounted to the valve housing 12 such that a hermetic seal is created. As used herein, hermetic seal means fluid permeability is prohibited across the joint. In one design, the flange 68 is press-fit into the valve housing 12. In another design, the flange 68 is welded to the valve housing 12.

Referring back to FIG. 1, a stem 72 is disposed within the interior region 64 of the bellow 56. A first end 74 of the stem 72 is configured to interact with the bellow 56, and the opposing end 76 of the stem 72 is configured to actuate the shut-off device 32 along an actuation axis 78. A bushing 80 is secured to the valve housing 12 as a guide for the stem 72. A bias spring 82 fits over the stem 72. In the disclosed example, the stem 72 floats substantially freely within the bellow 56, only interacting with the bellow 56 when the bellow 56 is compressed, as will be further explained below.

The auxiliary actuator assembly 16 further includes a protective cover 84 and a driver 86. The cover 84 is generally disposed over the bellow 56 and secured to the valve housing 12. The driver 86 is located in the exterior region 24 of the valve housing 12 and is configured to move the bellow 56. In one embodiment, the driver 86 includes a button 88, an outer screw 90, and an internal collar 92, and interacts with the protective cover 84. The button 88 generally conforms to the shape of the closed end 62 of the bellow 56 and is retained by the cover 84. The collar 92 is configured to mate against the button 88 and is moveably arranged to travel along the axis 78 of the stem 72 when the screw 90 is rotated.

In operation, electrical power is applied to the servo valve assembly 14, activating magnetic coils (not shown) that lift the armature 44 upward. The magnetic force in the upward direction overcomes the downward force of the springs 47 and 54, and the plug 42 is lifted off the pilot nozzle 36, thereby opening the pilot passage 38 and equalizing the pressure between the chamber 40 and the outlet 20. As the pressure in the chamber 40 bleeds off into the outlet 20, higher pressure from the inlet 18 then lifts up the shut-off device 32 and opens the main passage 28, allowing the fluid 30 to pass from the inlet 18 to the outlet 20.

The fluid 30 in the interior region 22 of the valve housing 12 may be caustic, environmentally harmful, or at a significantly different pressure than the exterior region 24 of the valve housing 12. In one embodiment, the fluid is a refrigerant. In a preferred embodiment, the fluid is a CFC, HFC, or HCFC refrigerant. The fluid 30 pressure may be as high as forty five (45) bar, or about six hundred fifty three pounds per square inch (653 psi). To prevent leakage between the interior region 22 and the exterior region 24 of the valve housing 12, the bellow 56 is mounted to the valve housing 12 so as to create a hermetic seal. Methods of forming the hermetic seal include welding or joining by interference fit, for example. In the disclosed example, the hermetic seal is formed by a deformable metallic seal between the valve housing 12 and the bellow flange 68. Specifically, the machined outer diameter 70 of flange 68 is approximately 0.05 millimeters smaller than a mating inner diameter 94 of the valve housing 12. The flange rests upon a thin lip 83 in the housing 12, shown in FIG. 1. In one embodiment, the lip 83 is approximately 0.35 millimeters wide. Compressing the flange 68 into the housing 12, for example by rotatably tightening the cover 84, deforms the flange 68 into the lip 83 to create a metallic seal.

The hermetic seal between the bellow 56 and the valve housing 12 also creates a hermetic seal between the interior region 64 of the bellow 56 and the exterior region 24 of the valve housing 12. In this manner, fluid 30 in the interior region 22 of the valve housing may migrate to the interior region 64 of the bellow 56, because it is not sealed, but the fluid 30 remains trapped therewithin. Similarly, fluid 30 pressure in the interior region 22 of the valve housing 12 will pressurize the interior region 64 of the bellow 56, but the expansible nature of the bellow 56 accommodates this condition.

When the servo valve assembly 14 is de-energized, the spring 45 forces the armature 44 downward and the spring 54 biases the sealing plug 42 against the pilot nozzle 36, stopping the flow.

When the shut-off device 32 is sealingly contacting the valve seat 26 in the de-energized state, the primary motive force to actuate the shut-off device 32 may be unavailable. For example, the servo valve assembly 14 may be in a de-energized state, and a power outage may prohibit operation. Additionally, there may be a need to open the shut-off device 32, for example to relieve upstream pressure in the inlet 18. The auxiliary actuator assembly 16 of the present invention is then activated to open the shut-off device 32.

To operate the auxiliary actuator assembly 16, the screw 90 is rotated to cause the collar 92 to move along the axis 78 of the stem 72 and push against the button 88. Further rotation of the screw 90 pushes the button 88 against the bellow 56. The bellow 56, being restrained against the housing 12, begins to compress. As the bellow 60 compresses, it engages the stem 72, moving the stem 72 along axis 78 until contact is made between the stem 72 and the pilot nozzle 36. Bushing 80 guides the stem 72 to prevent misalignment due to fluid 30 forces. In the embodiment disclosed, upward movement of the pilot nozzle 36 lifts the plug 42 and further compresses the spring 54 while lifting the shut-off device 32 (diaphragm) off the valve seat 26, allowing the fluid 30 to pass from the inlet 18 to the outlet 20. Other embodiments are possible wherein the stem 72 operates directly against the shut-off device 32.

To close the shut-off device 32 using the auxiliary actuator assembly 16, the screw 90 is rotated in the opposite direction and the process is reversed. The force exerted by the driver 86 is removed, and the bellow 56, having a spring-like characteristic, returns to its original position. The spring 82 biases the stem 72 away from the shut-off device 32 while the spring 54 in the servo valve assembly 14 biases the pilot nozzle 36 back to the sealed position on the valve seat 26.

The auxiliary actuator assembly 16 permits manual actuation of the shut-off device 32. Manual actuation may be desirable when no power is available. In the disclosed example, the auxiliary actuator assembly 16 is suitable for emergency use in servo valves and solenoid valves. However, the actuator assembly 16 may also be used as a primary actuator without departing from the scope of the invention. The driver 86 may be manually operated, or powered by electricity or hydraulics, for example.

Alternatively, the bellow 56 may be designed for a particular spring rate. The expansible nature of the bellow 56 allows for significant travel of the stem 72, and the degree of travel required to actuate the shut-off device 28 can be a design requirement on the bellow 56. For example, a measured force may be applied to the bellow 56 having a predetermined spring rate to compress it a resultant distance, which may advantageously move the stem 72 a fixed distance, for example the distance required to actuate the shut-off device 32.

Figure 3:
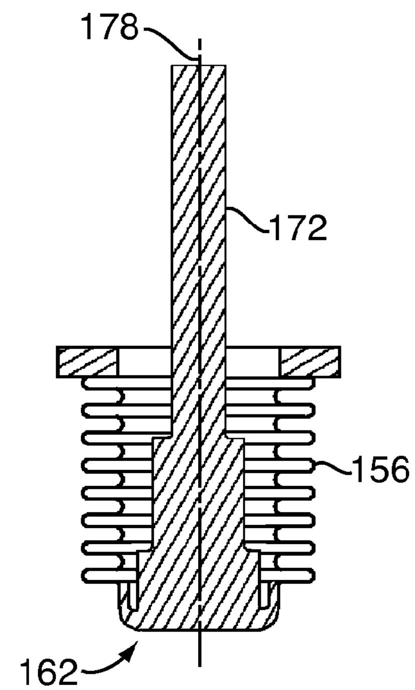
FIG. 3 is a cross sectional view of a bellow with a stem in accordance with another embodiment of the present invention.

Referring to FIG. 1 and FIG. 3, in another embodiment of the invention, wherein like numerals indicate like elements, the stem 172 is welded to the bellow 156. In one example design of this embodiment, the stem 172 forms at least a portion of the closed end 162 of the bellow 156. Welding the stem 172 and closed end 162 of the bellow 156 creates a hermetic seal between the interior region 22 of the valve housing 12 and the exterior region 24 of the valve housing 12, and assures proper alignment of the stem 172 along the axis 178 relative to the shut-off device 32.

Figure 4:
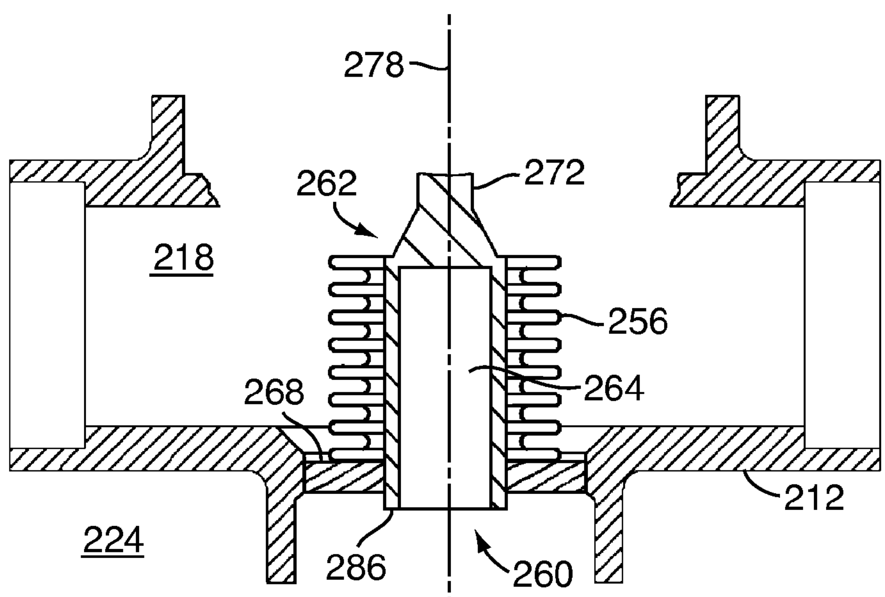
FIG. 4 is a cross sectional view of a valve housing and actuator assembly in accordance with a further embodiment of the present invention.

Referring to FIG. 4, yet another embodiment of the invention is shown wherein the driver 286 is configured to expand the bellow 256 rather than compress it. The open end 260 of the bellow 256 is oriented toward the exterior region 224 of the valve housing 212, which may be the ambient environment, and the closed end 262 of the bellow 256, shown with flange 268 welded to housing 212, is in contact with the stem 272. In the particular design shown, the stem 272 is welded to the bellow 256, but could also float freely, constrained by any suitable manner. The driver 286 (details not shown) acts upon the interior region 264 of the bellow 256, causing the bellow 256 to expand and push the stem 272 along axis 278 toward the shut-off device 38 (not shown). In this embodiment, a hermetic seal is created between the bellow 256 and the valve housing 212 in the same manner previously disclosed. The driver 286 may be advantageously disposed within the interior region 264 of the bellow 256, remaining hermetically sealed from interior region 218 of the valve housing 212.

Referring to FIG. 2, the bellow 56 may be manufactured from a plate or sheet of plastically deformable material which is fashioned, by deep drawing for example, to form the longitudinally extending tube 58 and closed end 62, and then forming the corrugated tubular sidewall 66. In another embodiment, the closed end 62 is manufactured as a separate piece and joined to the tube 58. Any suitable method of joining the closed end 62 to the tube 58 may be utilized, for example by welding, so long as the joint forms a hermetic seal. Similarly, the flange 68 may be joined in a manner to create a hermetic seal, by welding for example. The bellow 56 is preferably fabricated from metal, more preferably made of phosphorous bronze, and most preferably stainless steel.

Referring to FIG. 1, the stem 72 material is preferably stainless steel, but may be fabricated from any material suitable for the function and the fluid 30 environment. In the disclosed embodiment, the stem is a simple one-piece design.

The driver 86 may be of any suitable design for the purpose. For example, the driver 86 may be a single-piece design or an assembly. The cover 84, although not required, may advantageously be used to protect components of the driver 86. In the disclosed example, the cover 84 is threaded to the valve housing 12 and also interacts with the driver 86.

One advantage of the present invention is that the auxiliary actuator assembly 16 creates a hermetic seal with the valve housing 12. The hermetic seal allows a much greater pressure differential between the interior region 22 and exterior region 24 of the valve housing 12. The hermetic seal also enables a greater selection of fluids 30 within the interior region 22, for example CFC, HFC, or HCFC refrigerants.

Another advantage of the disclosed invention is that the stem 72 does not penetrate the bellow 56, obviating the need for a separate sealing arrangement. In one embodiment, the stem 72 is disposed within the bellow. In another embodiment, the stem 172 is welded to the bellow 156. An additional benefit of this arrangement is that the stem 72, 172, 272 may be fabricated from a simple, one-piece design that does not need to be isolated from the fluid 30 within the valve housing 12.

Although this invention has been shown and described with respect to the detailed embodiments thereof, it will be understood by those skilled in the art that various changes in form and detail thereof may be made without departing from the spirit and scope of the invention. For example, the invention may be used to actuate a normally-open valve.

What is claimed is:

1. A valve assembly comprising:

a stopper mechanism;

a primary actuator for actuating the stopper mechanism; and an auxiliary actuator assembly for actuating the stopper mechanism, the auxiliary actuator assembly comprising:

a bellow having an open end and a closed end, wherein the closed end forms a continuous, unpenetrated surface;

a stem operable to contact the closed end of the bellow and to actuate the stopper mechanism of the valve; and a driver configured to move the bellow wherein the movement of the bellow effects movement of the stem to actuate the stopper mechanism.

2. The valve assembly according to claim 1, wherein the bellow is a metal expansible bellow.

3. The valve assembly according to claim 1, wherein the driver is configured to compress the bellow.

4. The valve assembly according to claim 1, wherein the stem is disposed within the bellow.

5. The valve assembly according to claim 1, wherein the stem is welded to the closed end of the bellow.

6. The valve assembly according to claim 1, wherein the actuator assembly is an auxiliary actuator assembly.

7. The valve assembly according to claim 1, further comprising a bushing secured to the valve operable to guide the stem along an actuation axis.

8. The valve assembly according to claim 1, wherein the bellow forms a hermetic seal between an interior region of the valve and an exterior region of the valve.

9. The valve assembly according to claim 8, wherein the hermetic seal comprises a metallic seal.

10. The valve assembly according to claim 8, wherein the open end of the bellow is oriented toward the interior region of the valve.

11. The valve assembly according to claim 8, wherein the driver is disposed within the interior region of the bellow and the open end of the bellow is oriented toward the exterior region of the valve.

12. A valve assembly comprising:

a housing having an inlet and an outlet with an interior region formed therebetween, the interior region being separated by the housing from an exterior region;

a stopper mechanism configured to allow or prevent passage of a fluid from the inlet to the outlet;

a primary actuator for actuating the stopper mechanism; and an auxiliary actuator assembly comprising a bellow having an open end and a closed end, a stem operable to contact the closed end of the bellow and actuate the stopper mechanism, and a driver configured to move the bellow, wherein the closed end of the bellow forms a continuous, unpenetrated surface, and the movement of the bellow effects movement of the stem to actuate the stopper mechanism.

13. The valve assembly according to claim 12, wherein the bellow and the housing form a hermetic seal between the interior region and the exterior region.

14. The valve assembly according to claim 12, wherein the stopper mechanism comprises a shut-off device and a valve seat.

15. The valve assembly according to claim 12, wherein the stem is disposed within the bellow.

16. The valve assembly according to claim 12, wherein the stem is welded to the closed end of the bellow.

17. The valve assembly according to claim 12, wherein the driver is configured to compress the bellow.

18. The valve assembly according to claim 12, wherein the open end of the bellow is oriented toward the exterior region of the valve.

19. The valve assembly according to claim 12, wherein the fluid is a refrigerant.

20. The valve assembly according to claim 19, wherein the refrigerant is selected from the group consisting of chlorofluorocarbons, hydrofluorocarbons and hydrochlorofluorocarbons.

21. A method for actuating a valve, the method comprising the steps of:

providing a valve housing having a stopper mechanism therein;

providing a primary actuator for actuating the stopper mechanism;

providing an auxiliary actuator assembly comprising a bellow having an open end and a closed end and a stem operable to contact the closed end of the bellow and actuate the stopper mechanism, where the closed end of the bellow forms a continuous, unpenetrated surface; and moving the bellow toward the valve housing;

wherein the movement of the bellow causes the stem to actuate the stopper mechanism.

* * * * *